May 12, 1925.
W. J. PIKE
VEHICLE LAMP
Filed Dec. 27, 1921
1,537,494
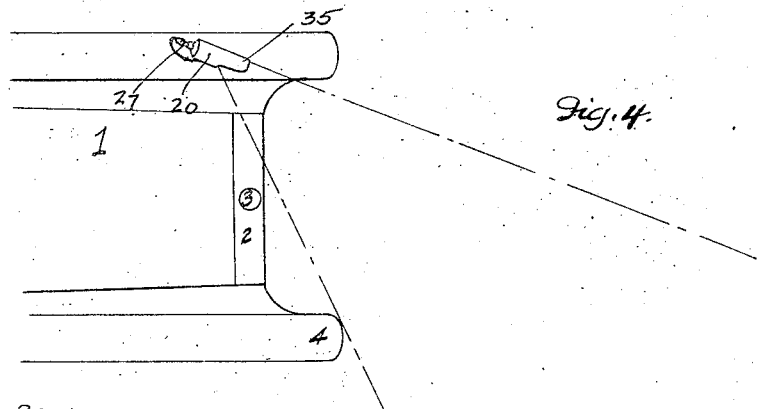
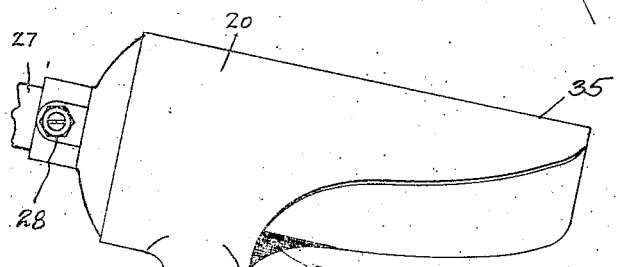
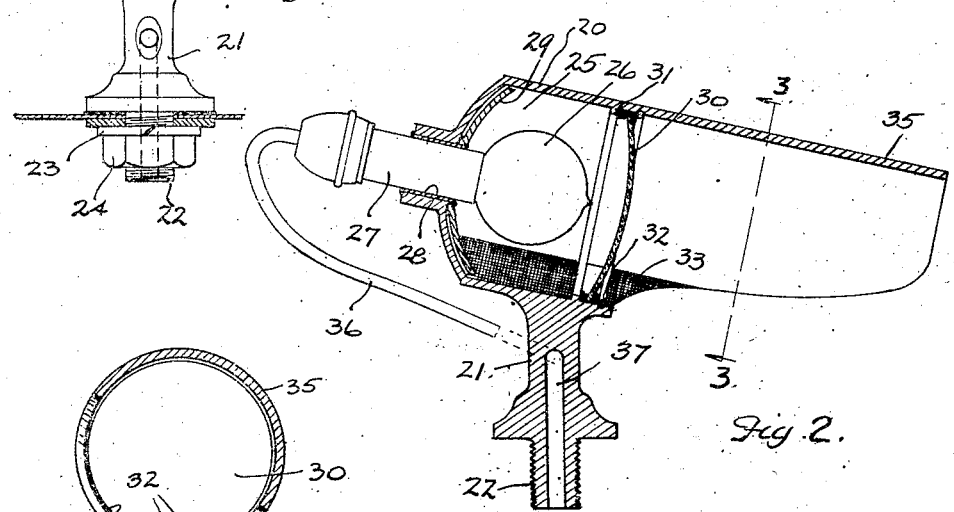
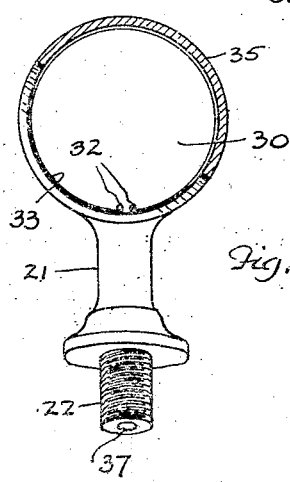
INVENTOR.
Walter J. Pike
BY
Ray, Oberlin & Ray
ATTORNEYS Patented May 12, 1925.

1,537,494

UNITED STATES PATENT OFFICE.

WALTER J. PIKE, OF NEWAYGO, MICHIGAN.

VEHICLE LAMP.

Application filed December 27, 1921. Serial No. 524,920.

*To all whom it may concern:*

Be it known that I, WALTER J. PIKE, a citizen of the United States, and a resident of Newaygo, county of Newaygo, and State of Michigan, have invented a new and useful Improvement in Vehicle Lamps, of which the following is a specification, the principle of the invention being herein explained, and the best mode in which I have contemplated applying that principle so as to distinguish it from other inventions.

The present invention relating, as indicated, to vehicle lamps, is directed to an improved type of lamp to be used on motor vehicles such as passenger cars and commercial automobiles, and is designed to be attached at some point on the foremost part of the car such as the radiator or fenders. A further object of the invention is the provision of a lamp which may be mounted, as described, and which shall be capable of throwing light rays forwardly and downwardly a short distance ahead of the vehicle to illuminate the road-way and the tips of the fenders, so that the driver may at all times, see the front of his vehicle, and hence, gage its width and the position which he may take when meeting approaching vehicles on narrow road-ways. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawings:—

Fig. 1 is a side elevation of a preferred type of lamp; Fig. 2 is a longitudinal section through the lamp shown at Fig. 1; Fig. 3 is a transverse section on the line 3, 3 in Fig. 2; and Fig. 4 is a diagrammatic plan view illustrating the mounting and use of the preferred type of lamp.

In Fig. 1, I have illustrated a motor vehicle 1 provided with a radiator 2 and upwardly projecting radiator bearing cap 3. The vehicle is provided with the usual front fenders 4 which project forwardly of the radiator a short distance as indicated.

In Figs. 1 and 2 I have shown a preferred type of lamp which consists of a casing 20 to which is integrally secured a post 21 and bolt 22. This casing is designed to be secured to the fender at about the center, that is, the crown of the fender at the highest point of the fender next to the radiator as indicated in Fig. 4. The lamp may be readily mounted by boring a hole vertically through the fender and brace under the fender thus mounting the bolt 22 in such hole and clamping it in position by means of a lock washer 23 and nut 24.

The casing 20 is provided with a cylindrical main portion which forms a chamber 25 in which a light bulb 26 is adjustably mounted on a support 27. The support 27 is slidable through an opening 28 in the rear of the casing and may be adjusted in any desired position by means of a set screw 28. Behind the bulb is mounted a reflector 29 and ahead of the bulb is mounted a lens 30 which is movably held in position against a gasket 31 by means of a snap ring 32. The lower portion of the inner wall of the casing adjacent to the bulb and lens 30, is darkened, as indicated at 33, to prevent the reflection upwardly of any of the rays coming from the bulb.

The casing is provided with a forwardly projecting hood 35 which has its outer left wall extending downwardly considerably more than its right wall in order to permit the light rays to be thrown across the vehicle while shutting off any light from going directly ahead of the vehicle or to the left. This path for the light is also secured by mounting the lamp in a slightly inclined position which is indicated in Fig. 4, the lamp being turned slightly to the right of the vehicle to a point wh..e the path of light will just take in the tip of the right front fender.

The connecting wires for the bulb may be enclosed in a tubular casing 36 extending from the supporting tube 27 through an opening in the post 21, to a central hole 37 therein, and may then be led away under the fender and connected to a source of current supply.

The present lamp can be made at a relatively low cost, can be very simply attached to the vehicle and serves a distinctly useful purpose not only in illuminating the roadway without throwing light rays into the eyes of persons approaching either by foot or in other vehicles, but in showing to the operator the exact width and position of the car. The present lamp does not necessarily have to be mounted upon the fender, the best position for such a lamp; but if mounted elsewhere such as on the side of the windshield or on the front of the top, the same precautions must be observed in its construction, namely, that the light rays must be thrown downwardly and laterally in order to catch the front end of the fender.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

A motor vehicle lamp comprising a cylindrical casing open at one end and provided with a lamp receiving aperture in the other end, the open end of the casing being formed into a hood open at the bottom and having downwardly extending side portions of unequal height, an annular flange on the exterior of said casing and surrounding said aperture, means for adjustably securing a lamp in said aperture, and means for attaching the casing to a vehicle in a position substantially longitudinal with said vehicle and inclined downwardly from rear to front.

Signed by me, this 20th day of December, 1921.

WALTER J. PIKE.